Jan. 29, 1957     C. V. TRANSTROM     2,779,124
ANIMAL TRAP
Filed Aug. 3, 1953                        2 Sheets-Sheet 1
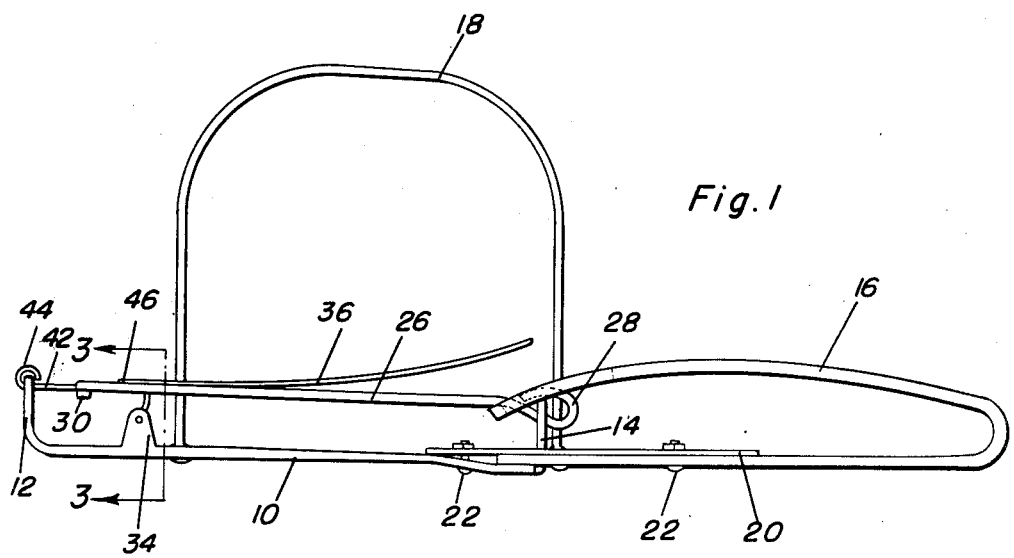
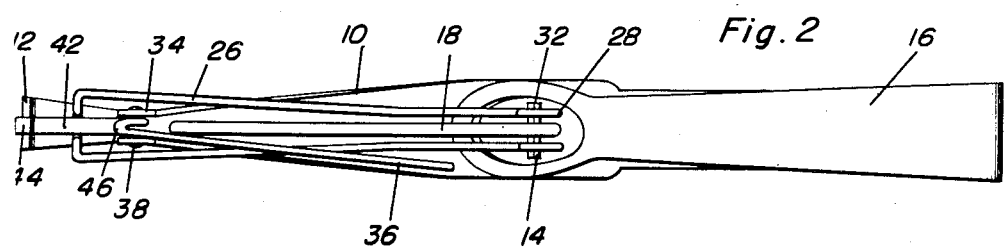
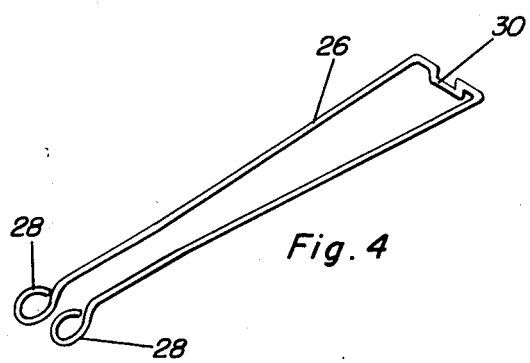
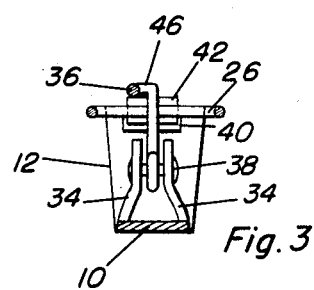
Clarence V. Transtrom
INVENTOR.

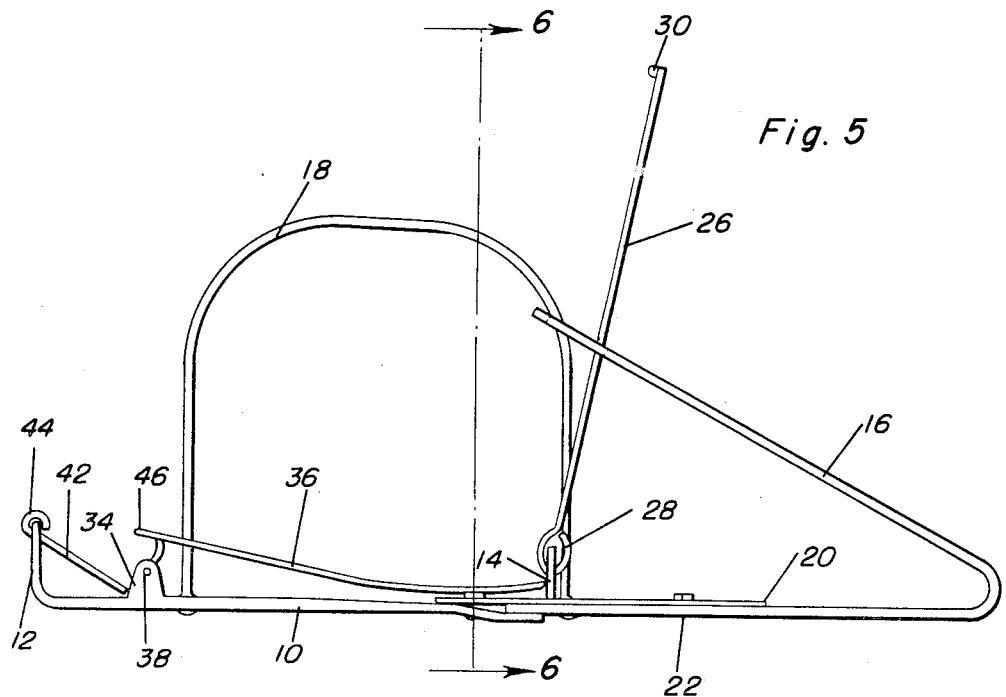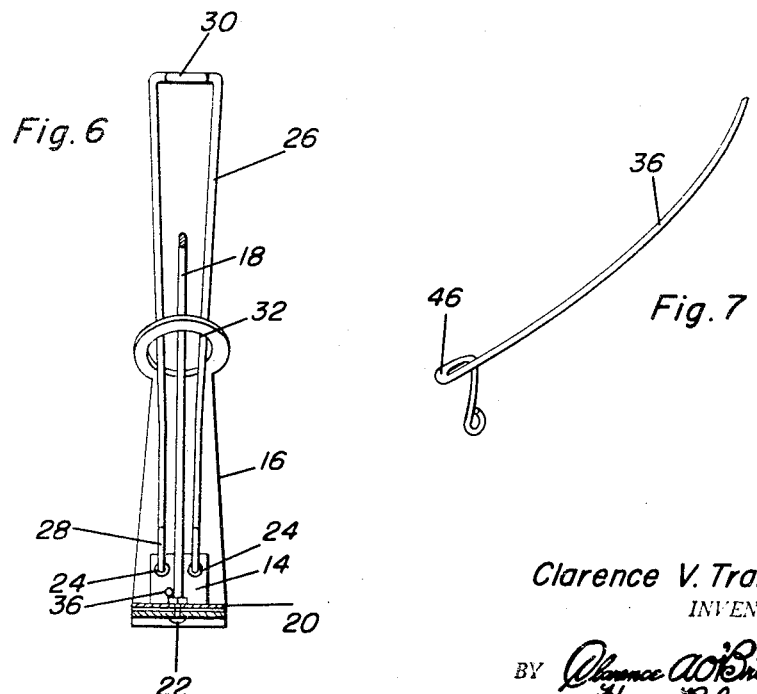

United States Patent Office 2,779,124
Patented Jan. 29, 1957

2,779,124

ANIMAL TRAP

Clarence V. Transtrom, Wannaska, Minn.

Application August 3, 1953, Serial No. 371,937

1 Claim. (Cl. 43—85)

This invention relates to an animal trap and more specifically provides a novel and economical animal trap.

An object of this invention is to provide an animal trap of the type having a stationary jaw and a spring urged movable jaw to cooperate in trapping an animal.

An important object of this invention is to provide a humane animal trap which will kill the trapped animal, thereby assuring the trapper of a good catch when the trap is set in a good location.

A further object of this invention is to provide an animal trap which is simple in construction, easy to operate, and cheap to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation view showing the structure of a specific embodiment of this invention in the set position;

Figure 2 is a top plan view of the structure of Figure 1 showing the general relationship and compactness of the animal trap;

Figure 3 is a transverse section taken substantially along section line 3—3 of Figure 1, showing details of the trigger mounting means and the relationship of the lever holding catch to the trigger projection;

Figure 4 is a perspective detailed view of the pivoted lever showing the depressed catch receiving portion in the bight thereof;

Figure 5 is a side elevation view showing the animal trap in a sprung position;

Figure 6 is a transverse section taken substantially along section line 6—6 of Figure 5 showing details of arrangement when in the sprung position; and, Figure 7 is a perspective detailed view showing the particular shape of the trigger.

Referring now more specifically to Figures 1 and 5 of the drawings, it will be seen that the numeral 10 generally designates a base being generally flat and elongated and having upturned ends 12 and 14 and secured to one end of said base portion 10 is a U-shaped spring 16 and attached to and upstanding from said base, is a U-shaped stationary jaw 18.

The base portion 10 and the lower leg of the U-shaped spring 16 lie substantially in the same horizontal plane and together form a supporting area for the animal trap. Securing the base 10 and the spring 16 to each other is an overlapping plate 20, secured to both the base member 10 and the spring 16 by suitable fastening means, such as bolts 22. The upstanding end portion 14 of the base 10 passes through an opening in the end portion of the lower leg of the U-shaped spring member as well as through a slot in the plate member 20 and this upward extension 14 is provided with a pair of laterally spaced apertures 24 adjacent the top of the projecting portion 14. Pivotally supported on the upstanding portion 14 of the base 10 is a U-shaped lever 26 with the ends of the legs of the U-shaped lever formed as eye members 28 which are pivotally secured in the apertures 24, as best seen in Figure 6. As clearly seen in Figure 4, the bight portion of the U-shaped lever has a depression 30 which is offset below the rest of the lever 26 for purposes hereinafter described.

Now referring specifically to Figures 2 and 6, it will be seen that the U-shaped spring member 16 has an apertured loop 32 at the end of its upper leg and this loop 32 receives therein the U-shaped pivoted lever as well as one leg of the U-shaped stationary jaw, for a purpose hereinafter described. It is clearly seen that the pivoted lever 26 is urged about its pivotal connection with upstanding portion 14 by the resiliency of spring member 16 and the leg of the U-shaped jaw member acts as a guide and limit means for the spring member 16 and its loop portion 32.

Referring now more specifically to the left-hand portion of Figures 1 and 5, it will be seen that the base member 10 has a pair of upstanding ears 34 pivotally supporting an elongated trigger 36 by a hinge pin 38 extending between the ears 34 as shown in Figure 3. An upstanding end portion 12 on the base member 10 is provided with a slot 40 as shown in Figure 3 and a dog or catch 42 is pivotally attached to the upstanding portion 12 by the use of an eye 44, which is secured in the slot 40. The end of the catch 42 engages under a projecting portion 46 of the trigger 36, and intermediate its ends the catch 42 is received in the depressed portion 30 of the lever 26 thereby holding the lever 26 in position substantially horizontal and parallel to said base 10.

The lever 26 straddles the U-shaped stationary jaw 18 and it is pivoted adjacent an end of one of the legs of said jaw 18, and the trigger 36 and the catch 42 are pivotally mounted to the base adjacent the other leg of the U-shaped jaw 18 and the lever 26 will be held in a horizontal position when the catch 42 engages over the top of the depressed portion 30 and hooked under the projecting portion 46 of the trigger 36. As the lever 26 is released, the spring 16 urges the lever 26 about its pivot and any animal releasing the trigger 36 will be trapped between the moving lever 26 and the stationary jaw 18 in an obvious manner.

The trapper grasps the U-shaped spring member 16 and squeezes the legs together, and at the same time pivots the lever 26 about its pivotal connection to upstanding portion 14, and as the lever reaches a horizontal position, which is parallel and spaced from the base member 10, the catch 42 is pivoted into contact with the offset portion 30 and the trigger is raised until the projecting portion 46 comes into contact with the end of catch member 42, and the spring action of the spring 16 tends to urge the lever 26 about its pivotal connection thereby maintaining the catch 42 in contact with the projecting portion 46. Immediately upon an animal stepping upon the trigger 36, the projecting portion 46 is disengaged from the catch 42 and the lever 26 pivots about its pivotal connection to upstanding portion 14 and any animal which has disengaged the trigger projecting portion 46 will be trapped between the moving lever 26 and the stationary jaw 18. The trigger 36 is constructed of wire material which is inherently resilient with the free end thereof curved upwardly and slightly laterally, as shown in Figures 1 and 7. This construction of the trigger permits depression thereof since the downward force will create a sliding action between the trigger 36 and the lever 26 as the upwardly curved end of the trigger is depressed. Very little movement of the projection 46 is required to release the catch member 42.

As appears obvious in the disclosure, this trap may be used advantageously in a place where the space is restricted, such as adjacent a path which the animals frequently travel and also over any hole in the ground such as a fox den, gopher hole or the like. Obviously, the trap may be made in any size, depending on the type of animal to be trapped, and obviously bait may be placed on the trigger 36 if it is so desired.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An animal trap comprising an elongated narrow base member having upturned end portions, a U-shaped leaf spring having one leg thereof secured to said base and forming a longitudinal extension thereof, a wire-like U-shaped stationary jaw having the ends of the legs thereof attached to said base, a U-shaped lever having a short bight portion and having the ends of the legs pivoted to the upturned end portion of said base adjacent the leaf spring and straddling said stationary jaw, a trigger pivotally attached to said base member remote from the leaf spring and extending transversely in relation to the stationary jaw in vertically spaced overlying relation to said base when in set position, said spring having a loop on the free end of the other leg in surrounding relation to said lever and one leg of said U-shaped jaw for urging said lever to an upstanding position substantially parallel to said one leg of the stationary jaw, and a catch pivotally attached to the other of said upturned end portions of the base for extending across the bight portion of the lever and engaging the trigger for maintaining the trigger in position to hold the lever parallel to the base against the action of said spring, said catch engaging a projection on said trigger, said lever pivoting under the action of said spring from a horizontal set position to a vertical sprung position for trapping an animal between the U-shaped stationary jaw and said lever.

References Cited in the file of this patent

UNITED STATES PATENTS

| 426,579 | Bachmann | Apr. 29, 1890 |
| 1,448,467 | Smith | Mar. 13, 1923 |
| 1,881,871 | Nerby | Oct. 11, 1932 |

FOREIGN PATENTS

| 721 | Great Britain | 1882 |
| 75,313 | Norway | July 11, 1949 |
| 661,197 | Great Britain | Nov. 21, 1951 |